Figure 1:
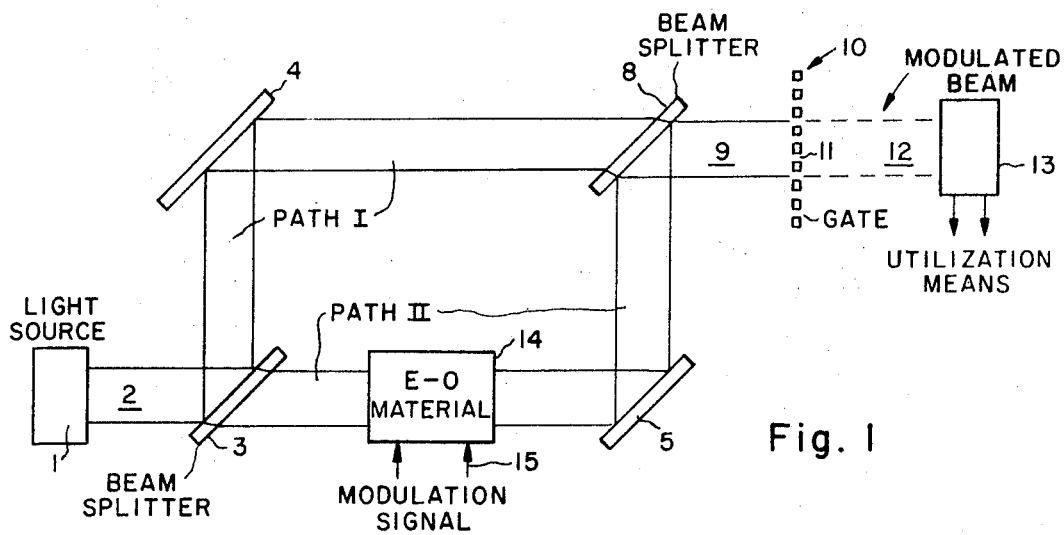

United States Patent

[11] 3,586,416

| [72] | Inventor | Dominick J. De Bitetto<br>Briarcliff Manor, N.Y. |
|---|---|---|
| [21] | Appl. No. | 745,911 |
| [22] | Filed | July 18, 1968 |
| [45] | Patented | June 22, 1971 |
| [73] | Assignee | U. S. Philips Corporation<br>New York, N.Y. |

[54] LIGHT MODULATOR BY GATED INTERFEROMETRY
9 Claims, 5 Drawing Figs.

[52] U.S. Cl. .................................................. 350/160,
350/150, 350/163, 350/169, 356/113, 250/199
[51] Int. Cl. .................................................. G02f 1/28,
G02f 1/26, G01b 9/02
[50] Field of Search .......................................... 350/150,
160, 163, 169; 331/94.5; 356/113; 250/199;
332/7.51

[56]         References Cited
        UNITED STATES PATENTS

| 2,848,921 | 8/1958 | Koulikovitch ............... | 356/106 |
| 3,331,651 | 7/1967 | Sterzer ....................... | 350/96 |
| 3,393,955 | 7/1968 | Sterzer ....................... | 350/150 |

Primary Examiner—Ronald L. Wibert
Assistant Examiner—Paul K. Godwin
Attorney—Frank R. Trifari ABSTRACT: A light modulator employing a Michaelson interferometer in which an incident beam is divided and recombined producing interference fringes in space. The light output may be selectively modified by providing a gate or mask at the output, and by electrically changing the optical path length of one leg. This can be accomplished through the Kerr or Pockels effect. In a modifications, Faraday rotation is employed to destroy the interference between two coherent beams.

LIGHT MODULATOR BY GATED INTERFEROMETRY

This invention relates to an electro-optic or magneto-optic light modulator.

There has been a need in the art for devices capable of modulating a beam of light as rapidly as possible. There has also been a need in the art for small devices having the above capability. The principal object of the invention is a light modulator capable of high speed and/or of small size.

This and other objects of the invention as will appear hereinafter are obtained by a device comprising, essentially, a Michaelson interferometer in which a collimated beam of quasi-monochromatic (which means fully or partly monochromatic) light is divided and then recombined at a small angle. At a certain position will be produced a spatial pattern of interference fringes. By providing at or close to that position a gate or mask comprising for instance transparent slots in an opaque support, positioned to allow the fringes to be aligned with the slots, greater than 50 percent of the output beam will emerge from the system. If now the optical path length in one leg of the interferometer is changed by half a wavelength, the entire fringe system is shifted half a fringe width. A properly spaced gate can then be used to intercept the shifted fringe pattern, with the result that very little light now emerges from the system. The changing of the optical path length can be obtained using the Kerr or Pockels effect. These permit very fast changes of the index of refraction of certain optical materials by the application of an electric field, thus offering a possibility modifying or modulating the light output of the device at megacycle and higher speeds. In another embodiment, Faraday rotation is employed to rotate the plane of polarization of the beam in one leg by 90 to destroy the destructive interference of the two beams at the exit slots, thereby permitting emergence of the light in both beams.

Figure 2:
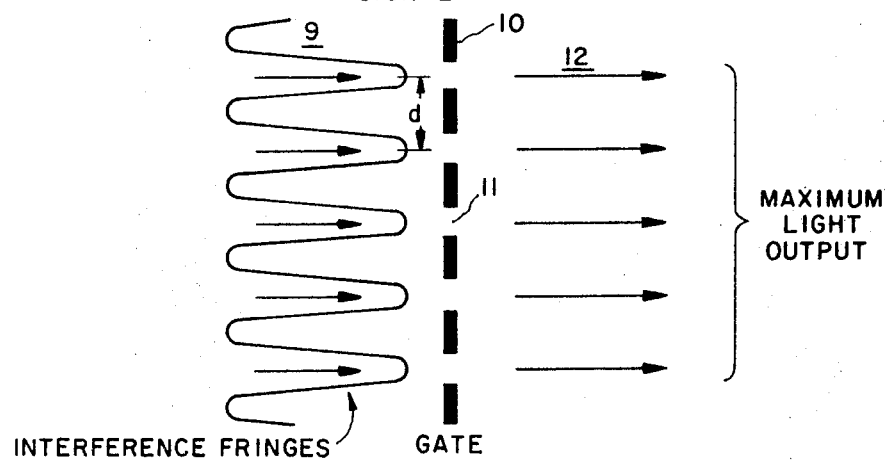
Figure 3:
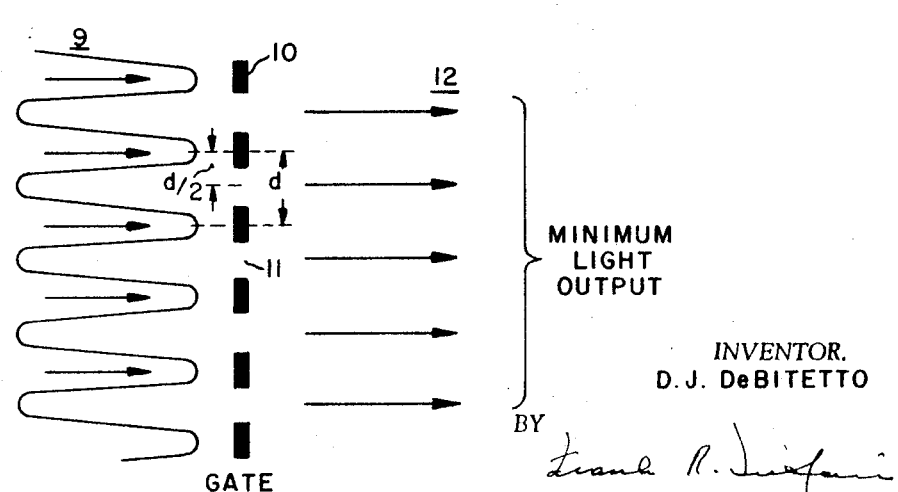
Figure 5:
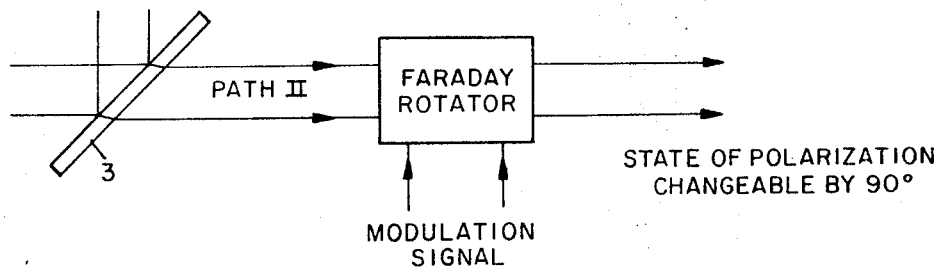
Figure 4:
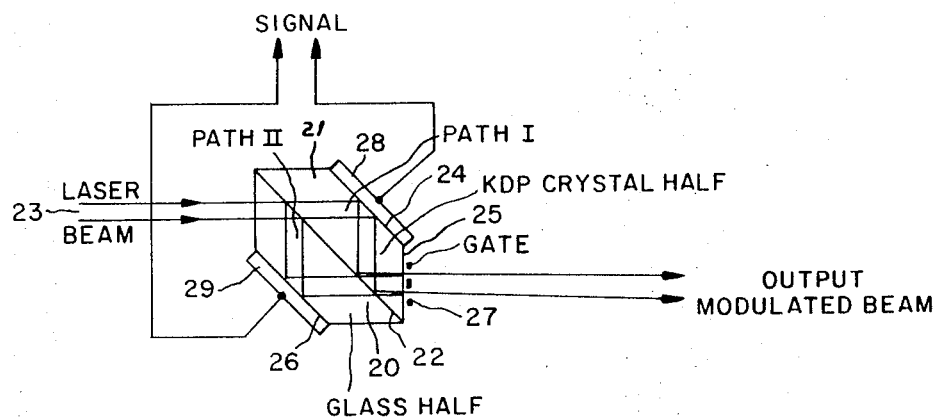

Several embodiments of the invention will now be described in greater detail with reference to the accompanying drawing, in which: FIG. 1 schematically illustrates one embodiment of the invention using electro-optical material; FIGS. 2 and 3 schematically illustrate the relationships of the interference fringes to the gate for the maximum and minimum light outputs; FIG. 4 shows a compact modification of the device illustrated in FIG. 1; FIG. 5 shows another modification employing Faraday rotation.

FIG. 1 illustrates a standard Michaelson interferometer with nonparallel mirrors. It comprises a collimated light source 1 producing a collimated monochromatic or partly monochromatic light beam 2. The beam is incident on a semitransparent mirror or light divider 3 which splits the beam into two optical paths as shown in FIG. 1. Path I includes a flat reflecting mirror 4. Path II includes a flat reflecting mirror 5. While the mirror 4 is at 45° providing 90° deflection of the beams, mirror 5 is positioned slightly off 45°. The two beams are reimpinged on a second light divider 8, which is parallel to the first 3. As a result, the output recombined beam 9 will have in it a pattern of parallel, equally spaced, straight (zero order) interference fringes with a spacing $d$ given by $2d\sin\theta=\lambda$, where $\theta$ is the half angle between the two beams, and $\lambda$ is the wavelength of the light. The slight nonparallel relationship of the mirrors, as is well known, can also be obtained by maintaining the reflecting mirrors 4 and 5 parallel but slightly offsetting the beam splitter 8. Located adjacent or elsewhere in the fringe system of the output optical path is a gate designated 10. The gate consists of an opaque mask having parallel, equally spaced openings or transparent areas or slots designated 11 in FIG. 1. The spacing between the slots or transparent areas 11 matches the periodicity of the above fringe pattern, and is arranged such that the slots can be aligned with the maxima in the interference pattern. This is illustrated in FIG. 2 which shows the output beam 9 and the fringes with the maxima aligned with the openings 11 in the gate 10. In this case, the output from the device designated by 12 is a maximum, and for the geometry illustrated in the figure will constitute approximately 80 percent of the beam power 9, depending on the relative sizes of the slots to opaque lines between. Reference numeral 13 indicates a suitable utilization means for that beam output 12.

By changing the optical path in one leg of the interferometer by one-half an optical wavelength, the entire fringe system will shift half a fringe width in a vertical direction for the device illustrated in the figures. This is accomplished by introducing into optical path II an electro-optic material 14 through which the beam passes. To that electro-optic material is provided means 15 for electro-optical control of its index of refraction. Only a small change in the index of refraction is necessary to change the optical path by half a wavelength to obtain a shift of the entire fringe system upwards or downwards by half a fringe width, which is illustrated in FIG. 3. As will be observed, by shifting the fringe pattern by $d/2$, the maxima now are aligned with the opaque portions 10 of the mask, and thus the minimum light output 12 is obtained.

Various materials can be used for the device illustrated in FIG. 1 at 14. For example, using the Kerr effect, in known electro-optic materials such as nitrobenzene or a KDP crystal, the application of an electric field to such a material, as is well known, will change its index of refraction. Similarly, using the Pockels effect in, for instance KDP, the application of an electric field will similarly modify its index of refraction the slight amount necessary to effect the small shift in the fringe pattern required. The foregoing are very fast effects, and thus the possibility of obtaining megacycle modulation speeds and higher is indicated. The mask or gate 10 can be made using photographic techniques as is well known in the art.

FIG. 4 shows a compact modification in which the various elements illustrated in FIG. 1 have been combined into a single integral structure. It comprises a transparent piece of ordinary glass 20 cut in the form of a half block as shown (the view in FIG. 4 is essentially an end view or a cross section). The second half 21 of the body has a configuration which essentially matches that of the first half and is made up of a KDP crystal. The two crystal halves 20 and 21 are cemented together along a partially silvered interface 22 so that the latter behaves as a beam splitter, dividing the incident beam energy approximately 50 percent. In this case, the input is from a laser which, as is well known, produces a collimated beam designated in the figure by reference numeral 23. The beam impinges orthogonally on the front surface of the glass half 20 and then on the semireflecting interface 22 causing the beam to divide along path I and path II. In path I the beam is confined within the KDP crystal and reflects off a remote surface 24 which had been polished and aluminized to form a highly reflective mirror but cut at an angle slightly different than 45° to the direction of the beam 23, for example, 4 minutes. After reflection from the mirror 24 the beam is returned to the dividing interface 22 and then after reflection from that exits from an output face 25 of the KDP crystal. The path II is in the glass half and includes a reflection from a similarly polished and aluminized surface 26 cut precisely at 45° which then causes the beam to be returned to the divider 22 where it coincides substantially with the beam in path I and thus exits from the surface 25. The gate in this case can be a series of evaporated reflecting parallel strips 27 deposited on the output face 25 of the KDP crystal forming the pattern of blocking and transmitting line elements approximately half millimeter wide as illustrated in FIGS. 2 and 3. Alternatively, a photographic transparency can be cemented to that face 25. On the surfaces 24 and 26 are supplied thickened silver or aluminum deposits to form electrodes 28 and 29 which may be connected as shown to a suitable signal source for establishing an electric field in the KDP crystal half for varying its refractive index. Alternatively, the front and rear surfaces (parallel to drawing plane) of the KDP may be silvered to form electrodes for establishing an electric field in the transverse direction. As still another alternative, the entire assembly shown may be placed in a microwave cavity which when a microwave field is established therein will cause the refractive index to change at the microwave frequency.

FIG. 5 illustrates part of still a further modification. It is essentially the same as the embodiment illustrated in FIG. 1 except that in the absence of the applied signal, the gate or mask is aligned so that the interference fringe maxima are blocked by the opaque portions 10 as shown in FIG. 3 providing minimum light output. In this embodiment, the optical path length in path II is not changed in order to shift the fringe pattern, but rather the polarization of the beam in the second path is modified to destroy its ability to interfere with the beam in the first path. As is known, two coherent beams which have their planes of polarization rotated by 90° will not interfere with one another. Thus, in the modified arrangement illustrated schematically in FIG. 5, in path II is provided a Faraday rotator which upon application of an electrical signal in a known manner utilizing the magneto-optic effect will cause the plane of polarization of the beam in path II to be rotated by 90°. Hence, when the beams are recombined at the divider 8, they have planes of polarization at 90° to one another and thus their interference is now destroyed. As a result, the fringe pattern disappears and a uniform bright field obtains, producing 50 percent, for the geometry shown, transmission of light through the gate 10 and thus a maximum output constituting the other extreme of the amplitude modulation cycle. Thus, in this modification the destruction or nondestruction of interference between two coherent beams by making their polarizations incompatible or compatible is employed as the basis for modulating the light output. As is well known in the field, suitable materials for the Faraday rotator include glass, quartz, zinc sulphide, phosphorus, and $Eu_2SiO_4$ the latter of which has an unusually large Verdet constant. While the embodiment illustrated contemplates rotating the plane of polarization in only one leg, it will be appreciated that a Faraday rotator can also be provided in the other leg to rotate the plane of polarization in the opposite direction. Thus, only a 45° rotation in each leg is necessary to achieve the 90° rotation to destroy the interference.

While I have described my invention in connection with special embodiments and applications, other modifications thereof will be readily apparent to those skilled in this art without departing from the spirit and scope of the invention as defined in the appended claims.

What I claim is:

1. A light modulator for collimated radiation comprising means for dividing an incident beam of collimated quasi-monochromatic radiation along two beam paths, means for recombining the divided beam in such a nonparallel manner as to cause them to interfere with one another producing a spatial fringe pattern exhibiting plural radiation maxima and radiation minima, fixed means having optically opaque and optically transparent areas regularly spaced in such a manner as to enable either the opaque or the transparent ares to be aligned with the fringe maxima or fringe minima, and means in at least one of the divided beam paths and responsive to electrical signals for controllably changing the length of said optical path and thereby spatially shifting the said interfering fringe pattern relative to the fixed optical means thereby changing the light output therethrough.

2. A light modulator as set forth in claim 1 wherein the optical path length changing means comprises an electro-optic material in said optical path and means for applying an electric field in the megacycle or higher range to said electro-optic material to change its index of refraction to modify the length of the optical path by approximately one-half a wavelength.

3. A light modulator as set forth in claim 1 wherein the optically opaque and transparent means comprises a slotted mask.

4. A light modulator as set forth in claim 1 wherein the two beams are recombined at a small angle to produce the spatial fringe pattern.

5. A light modulator as set forth in claim 9 wherein the electric field applying means comprises electrodes applied to both reflecting surfaces, one of said reflecting surfaces being slightly off-parallel with respect to said other reflecting surface.

6. A light modulator as set forth in claim 5 wherein the optically opaque and optically transparent means comprises a slotted mask provided on the exiting surface of the other body.

7. A light modulator for collimated radiation comprising means for dividing an incident plane polarized beam of collimated quasi-monochromatic radiation along two beam paths, means for recombining the divided beam in nonparallel relationship so as to cause them to interfere with one another producing a spatial fringe pattern exhibiting radiation maxima and radiation minima, means having plural optically opaque and plural optically transparent areas regularly spaced in such a manner as to enable the opaque areas to be aligned with the fringe maxima, and means in at least one of the divided beam paths and responsive to electrical signals for rotation the plane of polarization of the beam in said optical path up to 90° and thereby destroy the said interfering fringe pattern thereby increasing the light output through the output means.

8. A light modulator as set forth in claim 7 wherein the last-named means comprises a Faraday rotator.

9. A light modulator for collimated radiation comprising a first body of substantially optically transparent electro-optic material, a second body of substantially optically transparent material, a beam-splitting mirrored surface on one of said fist and second bodies, the other of said first and second bodies being joined to said one body at said beam-splitting mirrored surface, said one body also having a beam-receiving surface and an adjacent reflecting surface, said other body having a beam-exiting surface and an adjacent reflecting surface, said surfaces being oriented in such manner that an incident beam entering said one body at said receiving surface will impinge upon the beam-splitting surface dividing the incident beam into two beams, the first of which will be reflected by the beam-splitting surface towards the one-body reflecting surface from which it is reflected towards the beam-splitting surface where a portion of it will enter the other body, and the second of which after entering the other body will reflect off the other body reflecting surface and recombine with said portion of the first beam at a small angle and the recombined beam then exits from the other body at the exiting surface, said recombined beam producing an interference spatial fringe pattern having radiation maxima and minima, means in the path of the exiting beam and having optically opaque and optically transparent areas regularly spaced in such manner as to enable either the opaque or the transparent areas to be aligned with the fringe maxima or fringe minima, and means for applying an electric field to at least the first electro-optic body to change the optical path length for a beam therein and thereby spatially shift the said interfering fringe pattern relative to the optically opaque and transparent means thereby changing the light output therethrough.

UNITED STATES PATENT OFFICE
CERTIFICATE OF CORRECTION

Patent No. 3586416            Dated June 22, 1971

Inventor(s) DOMINICK J. DE BITETTO

It is certified that error appears in the above-identified patent and that said Letters Patent are hereby corrected as shown below:

Column 1, line 30, before "modifying" insert -- of --;
           line 33, "90" should read -- 90° --.

Column 3, line 29, "$Eu_2SiO_4t$" should read -- $Eu_2SiO_4$ --;
           line 30, "he" should read -- the --.

Column 4, line 25, "rotation" should read -- rotating --;
           line 34, "fist" should read -- first --;

Signed and sealed this 21st day of December 1971.

(SEAL)
Attest:

EDWARD M. FLETCHER, JR.      ROBERT GOTTSCHALK
Attesting Officer               Acting Commissioner of Patents